(12) United States Patent
Sills

(10) Patent No.: US 12,529,559 B2
(45) Date of Patent: Jan. 20, 2026

(54) EARTH OBSERVATION SCANNING SYSTEM

(71) Applicant: New Space Optics Limited, Hove (GB)

(72) Inventor: Liam Sills, Hove (GB)

(73) Assignee: NEW SPACE OPTICS LIMITED, Sussex (GB)

( * ) Notice: Subject to any disclaimer, the term of this patent is extended or adjusted under 35 U.S.C. 154(b) by 72 days.

(21) Appl. No.: 18/711,573

(22) PCT Filed: Nov. 21, 2022

(86) PCT No.: PCT/GB2022/052944
§ 371 (c)(1),
(2) Date: May 17, 2024

(87) PCT Pub. No.: WO2023/089336
PCT Pub. Date: May 25, 2023

(65) Prior Publication Data
US 2025/0012567 A1  Jan. 9, 2025

(30) Foreign Application Priority Data
Nov. 19, 2021 (GB) ..................................... 2116752

(51) Int. Cl.
*G01C 11/02* (2006.01)
*G02B 23/06* (2006.01)
(Continued)

(52) U.S. Cl.
CPC ............ *G01C 11/025* (2013.01); *G02B 23/06* (2013.01); *G02B 26/0891* (2013.01);
(Continued)

(58) Field of Classification Search
CPC ........... H04N 23/6811; H04N 23/6812; H04N 23/6815; H04N 23/6842; H04N 23/687;
(Continued)

(56) References Cited

U.S. PATENT DOCUMENTS 5,668,593 A    9/1997  Lareau et al.
6,747,686 B1 * 6/2004  Bennett ................ H04N 13/221
                                        348/145
(Continued)

FOREIGN PATENT DOCUMENTS

CN   111586256      8/2020
WO   2003032649     4/2003
(Continued)

OTHER PUBLICATIONS

International Search Report mailed on Feb. 16, 2023 for International Application No. PCT/GB2022/052944.
(Continued)

*Primary Examiner* — Michael Lee
(74) *Attorney, Agent, or Firm* — Tarolli, Sundheim, Covell & Tummino LLP

(57) ABSTRACT

An aspect of the disclosure provides An earth observation apparatus to be carried by a moving aerial platform or satellite for obtaining images of the surface of the earth, the apparatus comprising: an optical train having an optical field of view for imaging a region of the surface of the earth and being configured to form an image of the region at an image plane; an image sensor disposed at the image plane providing an imaging field of view; a view adjuster configured to control the optical train to: provide forward motion compensation for a stare time; and to displace the image, relative to the imaging field of view, in an across-track direction in a sequence of discrete displacement steps during each stare time; wherein the image sensor comprises a plurality of active areas, each comprising an area array detector and the active areas being spaced apart by inactive areas at the image plane wherein each active area captures a frame of image data for each discrete displacement step thereby to capture a plurality of frames for each discrete displacement step and the plurality of frames captured for each discrete displace- (Continued)

ment step are displaced in the across-track direction, relative to the imaging field of view, from the plurality of frames captured for the next discrete step.

21 Claims, 6 Drawing Sheets

(51) Int. Cl.
    *G02B 26/08*      (2006.01)
    *G02B 26/10*      (2006.01)
    *G02B 27/64*      (2006.01)
    *G03B 15/00*      (2021.01)
    *H04N 23/68*      (2023.01)

(52) U.S. Cl.
    CPC ......... *G02B 26/101* (2013.01); *G02B 27/642* (2013.01); *G02B 27/644* (2013.01); *G03B 15/006* (2013.01); *H04N 23/6811* (2023.01); *H04N 23/6812* (2023.01); *H04N 23/6815* (2023.01); *H04N 23/6842* (2023.01); *H04N 23/687* (2023.01)

(58) Field of Classification Search
    CPC .... H04N 23/68; H04N 23/681; H04N 23/682; H04N 23/683; H04N 23/684; H04N 23/686; G02B 26/105; G02B 26/108; G02B 26/0816; G02B 17/06; G02B 17/08; G02B 23/02; G02B 26/0875; G05D 1/0094
    See application file for complete search history.

(56) References Cited

U.S. PATENT DOCUMENTS

| | | | |
|---|---|---|---|
| 9,052,571 B1 * | 6/2015 | Lapstun | G06T 3/4038 |
| 2004/0114038 A1 * | 6/2004 | Louis | H04N 7/181 |
| | | | 348/E7.086 |
| 2013/0013185 A1 * | 1/2013 | Smitherman | H04N 23/55 |
| | | | 348/148 |
| 2013/0142500 A1 | 6/2013 | Yavin | |
| 2015/0008306 A1 * | 1/2015 | Ellis | G02B 26/10 |
| | | | 250/208.1 |
| 2019/0094344 A1 * | 3/2019 | Steinmann | G01C 15/002 |
| 2020/0073107 A1 | 3/2020 | Muzilla | |
| 2023/0280159 A1 * | 9/2023 | Nixon | G01C 11/025 |
| | | | 382/154 |

FOREIGN PATENT DOCUMENTS

| | | | |
|---|---|---|---|
| WO | 2012020413 | 2/2012 | |
| WO | 2023089336 | 5/2023 | |
| WO | WO-2024081553 A1 * | 4/2024 | H04N 23/685 |

OTHER PUBLICATIONS

Combined Search and Examination Report mailed Jan. 17, 2022 for Application No. GB2116752.3.

Written Opinion of the ISA mailed on May 25, 2023 for International Application PCT/GB2022/052944.

* cited by examiner

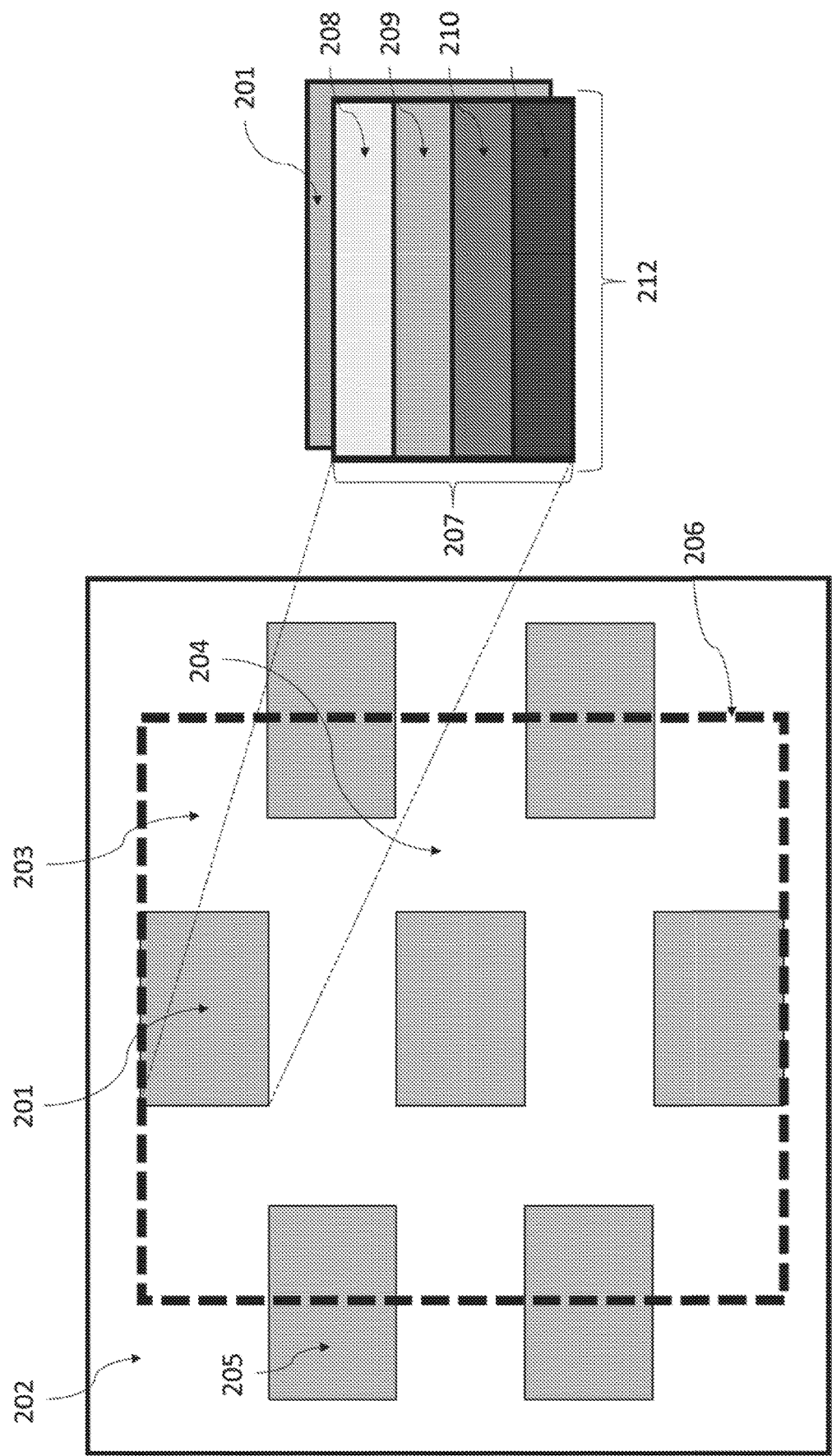
Figure 2: Detector layout on focal plane diagram

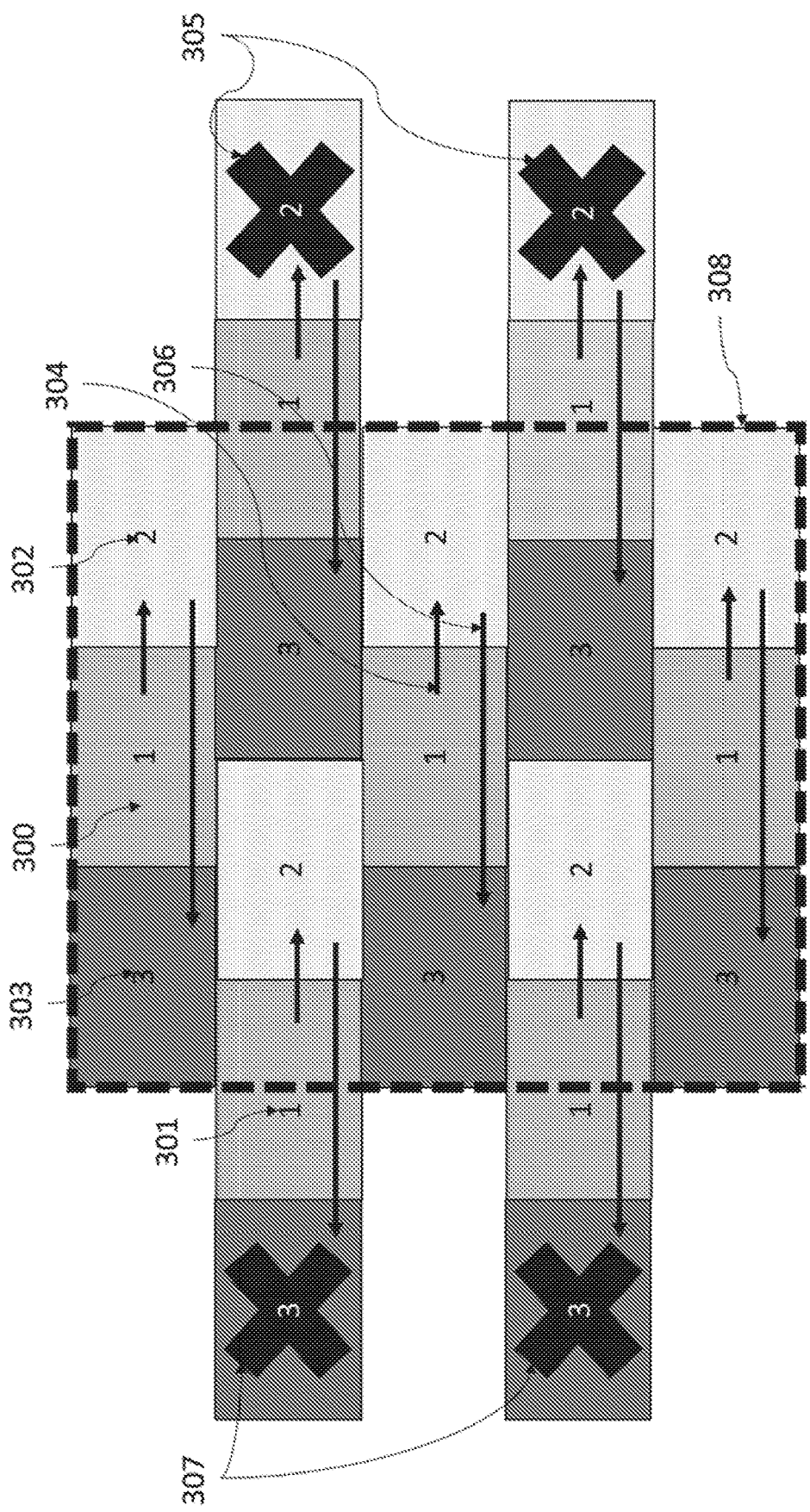
Figure 3: Detector projection and share steps diagram

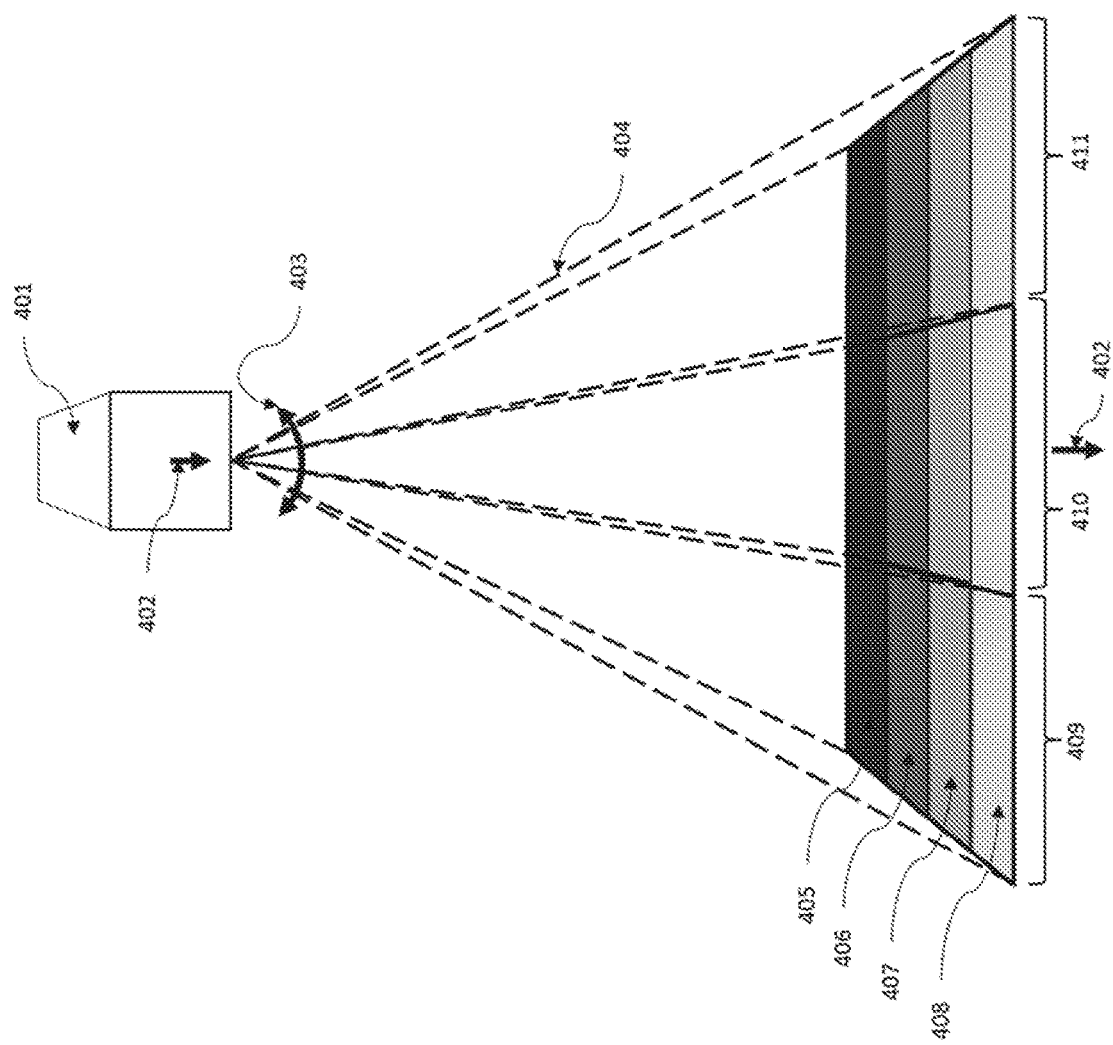
Figure 4: 2D mapping diagram 1.

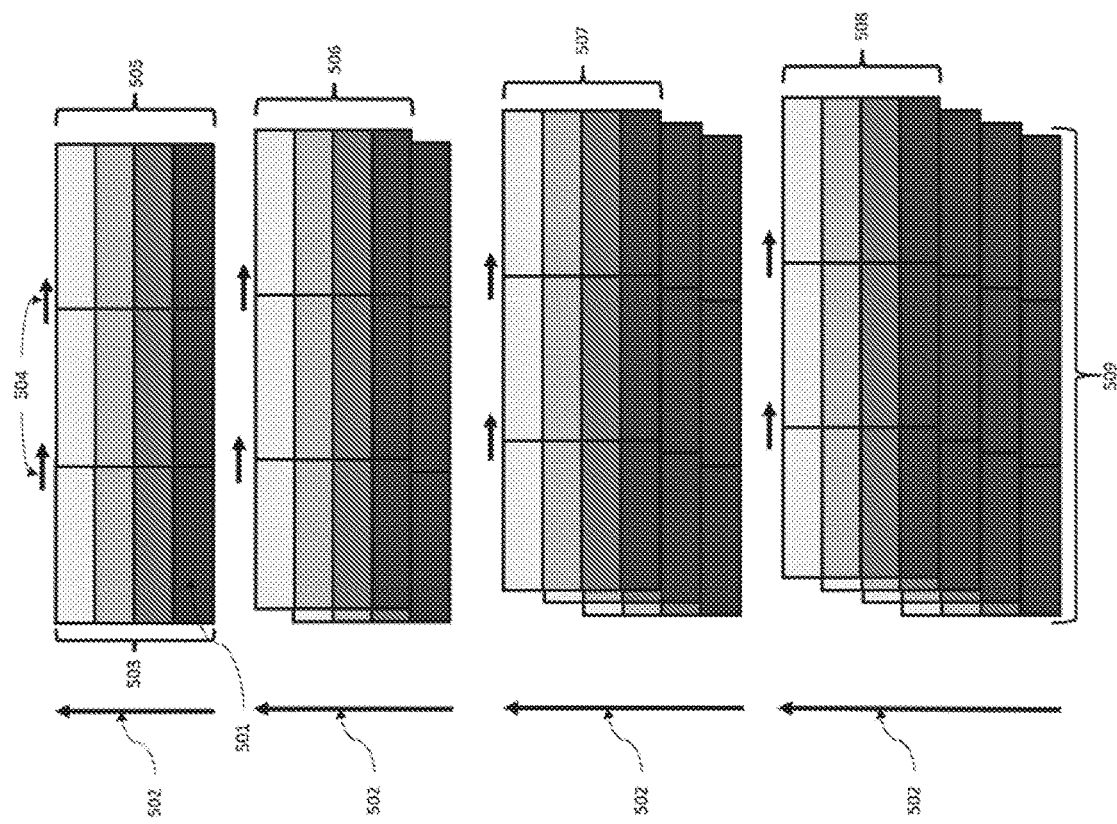
Figure 5: 2D mapping diagram 2.

EARTH OBSERVATION SCANNING SYSTEM

RELATED APPLICATIONS

This application is a U.S. National Stage Application filed under 35 U.S.C. § 371 of PCT/GB2022/052944, filed on 21 Nov. 2022, which claims the benefit of United Kingdom Application No. 2116752.3, filed 19 Nov. 2021. The entire contents of each of the above-identified patent applications are incorporated herein by reference.

TECHNICAL FIELD

The present disclosure relates to methods and apparatus for earth observation from satellites or aerial platforms, such as aircraft.

More particularly the present disclosure relates to methods and apparatus for imaging, and still more particularly to improvements in optics and image sensors for this purpose and techniques for the control of such things.

BACKGROUND

Aerial imaging systems and satellite earth observation instruments suffer a trade-off between resolution and field of view. It is often called the 'drinking straw problem'. Imaging systems, because of information and energy conservation laws, can record a limited amount of information at their focal planes. The amount of information recorded at the focal plane of an imaging optic is defined by the limiting resolution of the optics, the quality of optical design and manufacture, and the angular size of the well corrected focal plane. The information recorded is proportional to the ratio of the solid angle representing the field of view to the limiting resolution solid angle.

In order to increase resolution, focal length must increase for a given detector sampling resolution. The detection medium can be film, CCD and CMOS detectors, image intensifiers, bolometers etc. Given that sensitivity of light recording media is fixed by either geometry or the physical process used to encode information, there is a need to increase focal length rather than make image sampling device pixels smaller to attain higher resolution images. Using a longer focal length is far cheaper than designing a new photonic detector technology for example. Increasing the focal length of an optical design, and the wish to improve the limiting resolution in proportion, we must also increase the aperture in proportion. This is true even of perfect optical designs and tolerances due to the diffraction limit. In other words, the f-number must be kept constant. In order to keep the field of view constant as focal length is increased (i.e. improve the drinking straw trade-off) the focusing optic must also increase in size, in proportion to the field angle and aperture. All practical optics, with either refracting or reflecting surfaces, positioned away from the aperture stop along the optical axis of the system, will see a large increase in volume due to both aperture and field angle increases. On-axis or off-axis telescope systems like a Cassegrain or a TMA etc, have surfaces separated from the aperture stop by definition, and so suffer greatly from this issue. Simple Euclidian geometry dictates that in order to achieve an increase in resolution while maintaining field of view, optical surfaces must increase in area to accommodate light from across the field of view without light rays vignetting, such that sufficient aperture is maintained for all field angles at the desired resolution.

As optics get larger, limitations of their physical materials (refractive or reflective) become problematic. This occurs for two main reasons; first, the physical properties of materials used for optical surfaces are fixed. They are thus subject to power scaling laws that pose practical limits to the size of an optic and its ability to maintain its form under load, e.g. weight or a thermal gradient. Second, as angular resolution increases, especially if field of view is maintained, alignment and surface form error requirements become ever tighter and more difficult to achieve. This latter issue scales roughly with the area of aperture. Both these effects put limits on feasible optical designs with known refractive and reflective technology.

Along with these limitations another problem occurs with detector technology at the focal plane. Assuming an electro-optic device capable of converting light into electrical signals for transfer to memory storage media, there are limits to the size of both individual pixels and total area covered.

These limits work in opposition to each other. As pixels get smaller, increasing sample resolution, it is more difficult to increase detector area due to falling fabrication yield.

These things represent and give rise to significant technical problems for which there exist no satisfactory solution in the prior art. For example, how are large areas of the earth to be imaged at high resolution with practical image sensors and/or without large heavy optical systems?

SUMMARY

Aspects and examples of the invention are set out in the appended claims and aim to address at least some of the above described technical problems and other problems.

In an aspect there is provided an earth observation apparatus to be carried by a moving aerial platform or satellite for obtaining images of the surface of the earth, the apparatus comprising:
  an optical train having an optical field of view for imaging a region of the surface of the earth and being configured to form an image of the region at an image plane;
  an image sensor disposed at the image plane, the image sensor comprising a first active area providing an imaging field of view, wherein the imaging field of view is smaller than the image of the region at the image plane;
a view adjuster configured to control the optical train to:
  (a) provide forward motion compensation for a stare time during which the apparent along-track position of the region of the surface of the earth (e.g. as observed at the image plane) is static. This compensates for along-track motion of the moving aerial platform or satellite; and
  (b) displace the image relative to the imaging field of view (e.g. as observed at the image plane) in an across-track direction in a sequence of displacement steps during each stare time.

In this way the image sensor can collect image data from a swathe of regions of the surface of the earth. Because the swathe can be wider than the imaging field of view in the across-track direction, sensors of an ordinary practical size can be used. The need for very high yield associated with large sensors can be avoided.

In an aspect there is provided an earth observation apparatus to be carried by a moving aerial platform or satellite for obtaining images of the surface of the earth, the apparatus comprising:
  an optical train having an optical field of view for imaging a region of the surface of the earth and being configured to form an image of the region at an image plane;

an image sensor disposed at the image plane providing an imaging field of view;

a view adjuster configured to control the optical train to:
provide forward motion compensation for a stare time; and to displace the image, relative to the imaging field of view, in an across-track direction in a sequence of discrete displacement steps during each stare time;

wherein the image sensor comprises a plurality of active areas, each comprising an area array detector and the active areas being spaced apart by inactive areas at the image plane wherein each active area captures a frame of image data for each discrete displacement step thereby to capture a plurality of frames for each discrete displacement step and the plurality of frames captured for each discrete displacement step are displaced in the across-track direction, relative to the imaging field of view, from the plurality of frames captured for the next discrete step.

The frame of image data captured by each active area for each discrete displacement step may correspond to a tile of the image, for example because it comprises only a part of the imaging field of view as a whole. Typically, this image data is captured in a snapshot.

The frame image data captured by each active area for each discrete displacement step may be captured either (a) prior to the each discrete displacement step or (b) after the each discrete displacement step, for example wherein the capture of image data is interleaved between displacement steps.

The view adjuster may be configured to hold the across track position of the image relative to the imaging field of view static while the image data is captured. For example it may hold the across track position static while each frame of image data is captured by each active area.

Typically the image sensor comprises an electro-optical device comprising an array of light sensing pixels, such as a CCD or active-pixel sensor for example a CMOS sensor.

The image sensor may further comprise a second active area spaced apart from the first active area in an across-track direction in the image plane.

The image sensor may comprise a plurality of active areas. Each active area may be an area array sensor configured to capture a snapshot image of a corresponding area of the imaging field of view. For example, each area array sensor may comprise a rectangular array of pixels comprising a plurality of rows and a plurality of columns. Thus, each active area of the image sensor may be provided by a separate image sensing chip.

The snapshot may be captured in an exposure time of the area array, for example a period over which the intensity at each pixel in the area array is sensed simultaneously. It will be appreciated in the context of the present disclosure that such area array detectors are distinct from line scanning detectors, which may be operated to perform either whisk-broom or push-broom type scanning and may use techniques such as TDI and other types of line scanning. Unlike line scanning techniques area array sensors image all the pixels of the area array together in a single snapshot.

The image sensor may be operated so that each of the plurality of active areas captures a snapshot image at each displacement step, before the imaging field of view is displaced again in the across-track direction for the next displacement step. Each such snapshot image corresponds to an area of the imaging field of view occupied by the relevant active area at the focal plane. Thus, the focal plane can be sparsely sampled. The image data from each active area provides a tile. These tiles can be assembled together, e.g. by stitching, to provide an image based on the tiles combined from the sequence of steps.

The displacement steps typically are discrete and take place in a sequence in which the active areas take a snapshot image while the emerging field of view is not being displaced by the view adjuster, then after the snapshot the emerging field of view is displaced again. Then after that displacement step is complete the active area takes another snapshot and so on. new paragraph it will be appreciated in the context of the present disclosure that snapshots and discrete displacements may be interleaved in any appropriate sequence. For example, a displacement step may start the sequence or a snapshot may start the sequence, and there may be one or more snapshots between each displacement, e.g. at each step. Typically, at each step at least one snapshot is taken. Typically, the view adjuster is not operated to move the imaging field of view in the across track direction during the exposure time of each snapshot.

Typically, at each discrete displacement step each said active area (e.g. each area array detector) takes an image frame in a snapshot. Such an image frame may be referred to herein as a tile of image data.

The imaging field of view generally is smaller than the image of the region of the surface of the earth at the image plane.

The view adjuster may provide the forward motion compensation such that, for the duration of the stare time, the apparent along-track position of the region of the surface of the earth is static to compensate for along-track motion of the moving aerial platform or satellite.

The sequence of discrete displacement steps may be such that the image sensor collects image data from a swathe of regions of the surface of the earth, wherein the swathe is wider than the imaging field of view in the across-track direction.

The active areas of the image sensor each comprise a separate area array detector, and the active areas are spaced apart from one another at the image plane by inactive areas.

It will be appreciated in the context of the present disclosure that the spacing of the active areas may provide a sparse sampling of the image—e.g., that the active areas, when operated to capture an image frame, provide image data corresponding to a set of tiles. The location and size of each tile of image data in the image typically corresponds to the location and size of a corresponding one of the active areas in the image plane. In these embodiments, at each displacement step, the frame of image data captured by each active area for each discrete displacement step provides one of said tiles of image data.

The active areas may be separated by inactive areas. Such embodiments increase the rate at which images can be captured to cover a given area of the surface of the earth.

The spacing between the active areas of the image sensor and the displacement steps may be selected so that the swathe spans the optical field of view in the across-track direction. The sequence of displacement steps may be configured so that image data obtained from the active area(s) during each stare time provides a contiguous swathe.

The sequence of displacement steps may comprise at least one forward displacement step in a first (across-track) direction and at least one reverse displacement step in a second (across-track) direction opposite to the first direction. The displacement steps may be selected to provide an across-track overlap between adjacent portions of image data.

The image sensor may comprise a third active area, spaced apart from the first active area in an along-track direction in the image plane. The third active area may be misaligned with the first active area in the across-track direction. The third active area may also be misaligned with the second active area in the across-track direction, for example the third active area may be disposed on (e.g. across) a midline between the first active area and the second active area.

The sequence of displacement steps may be selected so that image data obtained from the third active area during each stare time spans the swathe in the across-track direction. As noted below, in addition to sub-field-of-view shifts, after each sequence of displacement steps the gross optical field of view can be shifted, and another sequence of sub-field displacement steps can be performed within that shifted optical field of view. The sequence of displacement steps may be selected so that at least some of the image data from the first and/or second active area is redundant (e.g. duplicates) imaging of areas that have already been imaged in prior gross across track field shifts. The stare time may be selected so that the along-track motion of the field of view during successive stare times is less than the along-track width of the imaging field of view to provide an along-track overlap between adjacent images.

The image sensor may comprise a plurality of active areas spaced apart in an array, and the array may comprise a plurality of rows of active areas. Each row may be arranged so that the spaces between active areas are staggered with respect to the spaces in an adjacent row, for example in the manner of a stretcher-bond brick-laying pattern.

The array may comprise a plurality of discrete image sensor chips and the wiring connections for the chips may be provided in the spacing between them in the image plane.

For example, the image sensor may comprise a plurality of separate active areas. These may each comprise separate read-out and/or control circuitry. For example, they may each be provided by respective corresponding ones of a plurality of individual image sensing ICs (integrated circuit). The active areas may be separate and spaced apart at the image plane.

The view adjuster may comprise a first beam steering element for displacing the field of view in the across-track direction. The first beam steering element may comprise a reflective element such as a fast-steering mirror. The first beam steering element may comprise an electromechanical actuator configured to provide discrete angular displacements of the reflective element, for example the electromechanical actuator may comprise a galvo scanner.

The discrete angular displacements may correspond to discrete across-track displacements of the field of view on the surface of the earth. These discrete across track displacements may be selected to correspond to the size of the active areas of the image sensor in the image plane. For example, once the optical field of view has been sampled by sub-field of view shifts which 'fill in' the sparsely populated focal plane samples, it may further be used to shift the whole optical field of view across track (gross field of view shifts) to image multiple adjacent ground areas in the same fashion during each stare time (also referred to in some cases as an EMC period).

The view adjuster may comprise a second beam steering element for displacing the field of view in the along-track direction to provide the forward motion compensation. The second beam steering element may be configured to displace the field of view for the stare time at a rate selected based on the along-track motion of the aerial platform or satellite, and to provide a reset displacement between each stare time. The second beam steering element may comprise a Risley-prism pair.

The optical train may comprise a boresight pointing vector corresponding to the direction from the optical train to the region of the surface of the earth, and the view adjuster may be configured to displace the field of view by changing the direction of the boresight pointing vector.

Some particular embodiments are described below with reference to the drawings. These embodiments are presented with particular combinations of features. For the avoidance of doubt, the disclosure of this application is in-ended to be considered as a whole. Any feature of any one of the examples disclosed herein may be combined with any features of any of the other examples disclosed herein. The mere description of two features in collocation should not be taken to imply that either is essential to the other, nor inextricably linked to it.

Features of methods may be implemented in suitably configured hardware, and the functionality of the specific hardware described herein may be employed in methods which may implement that same functionality using other hardware.

In an aspect there is provided an earth observation apparatus to be carried by a moving aerial platform or satellite for obtaining images of the surface of the earth, the apparatus comprising:

an optical train having an optical field of view for imaging a region of the surface of the earth and being configured to form an image of the region at an image plane;

an image sensor disposed at the image plane providing an imaging field of view, wherein the imaging field of view is smaller than the image of the region at an image plane;

a view adjuster configured to control the optical train to:
provide forward motion compensation for a stare time during which the apparent along-track position of the region of the surface of the earth is static to compensate for along-track motion of the moving aerial platform or satellite; and to displace the image, relative to the imaging field of view, in an across-track direction in a sequence of discrete displacement steps during each stare time so that the image sensor collects image data from a swathe of regions of the surface of the earth, wherein the swathe is wider than the imaging field of view in the across-track direction wherein the image sensor comprises a plurality of active areas, each comprising an area array detector and the active areas being spaced apart by inactive areas at the image plane wherein each active area captures a frame of image data for each discrete displacement step thereby to capture a plurality of frames for each discrete displacement step and the plurality of frames captured for each discrete displacement step are displaced in the across-track direction, relative to the imaging field of view, from those the plurality of frames captured for the next discrete step.

The spacing between the active areas of the image sensor and the discrete displacement steps may be selected so that the swathe spans the optical field of view in the across-track direction.

The sequence of discrete displacement steps may be configured so that image data obtained from the active area during each stare time provides a contiguous swathe.

The sequence of discrete displacement steps may comprise at least one forward displacement step in a first direction and at least one reverse displacement step in a second direction opposite to the first direction. The discrete displacement steps may be selected to provide an across-track overlap between adjacent portions of image data.

The view adjuster may be further configured to provide a gross field of view shift by displacing the optical field of view in an across-track direction after the sequence of displacement steps, for example this may reverse the across rack displacement provided by the sequence of displacement steps. A second sequence of said displacement steps may be performed after the gross field of view shift, before a subsequent gross field of view shift to reverse the displacement.

As an alternative the reverse displacement of the field of view may be provided by a sequence of discrete displacement steps, and the active area(s) of the image sensor may be controlled to capture snapshot image(s) at each displacement step.

BRIEF DESCRIPTION OF DRAWINGS

Embodiments of the disclosure will now be described in detail, by way of example only, with reference to the accompanying drawings, in which:

FIG. 2 shows a sparse image sensor;

FIG. 3 illustrates a set of image tiles acquired by an image sensor such as that shown in FIG. 2 used with a system such as that shown in FIG. 1C;

FIG. 4 shows a 2D mapping diagram; and

FIG. 5 shows a second 2D mapping diagram.

In the drawings like reference numerals are used to indicate like elements.

DETAILED DESCRIPTION

Figure 1B:
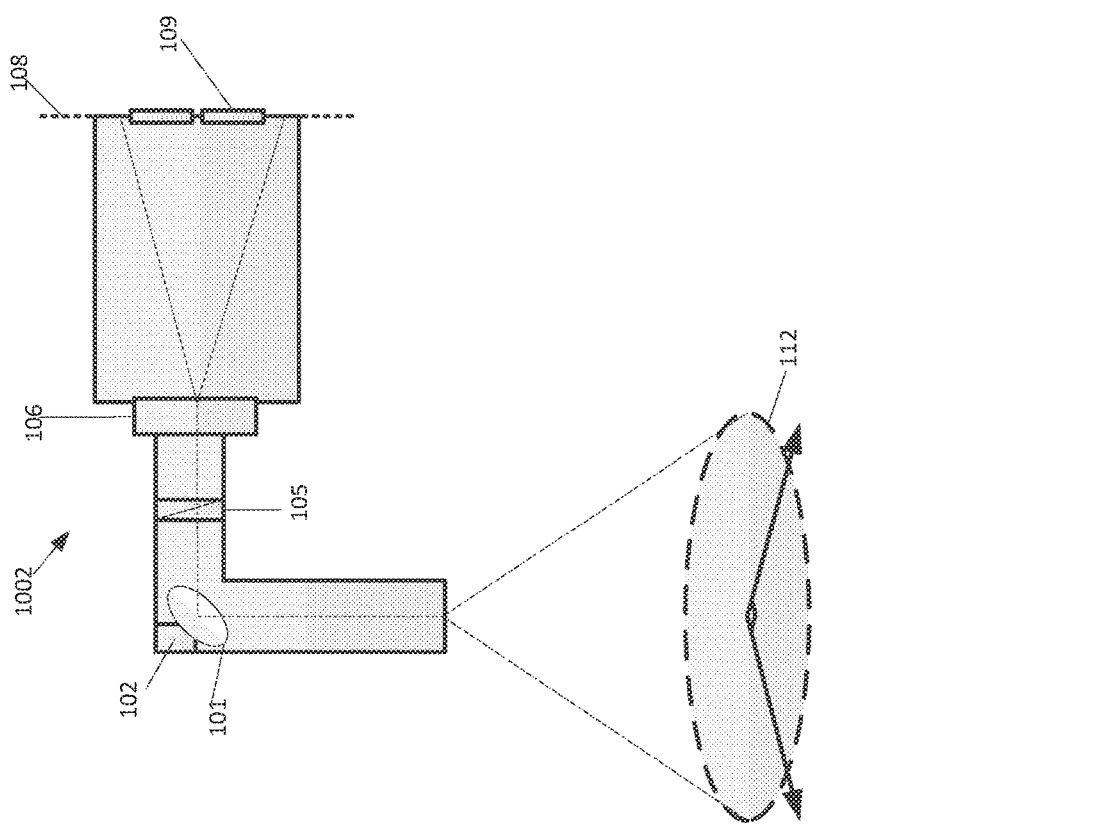
FIG. 1B shows an illustration of an earth observation apparatus to be carried by an aerial platform or satellite such as that illustrated in FIG. 1A.
Figure 1A:
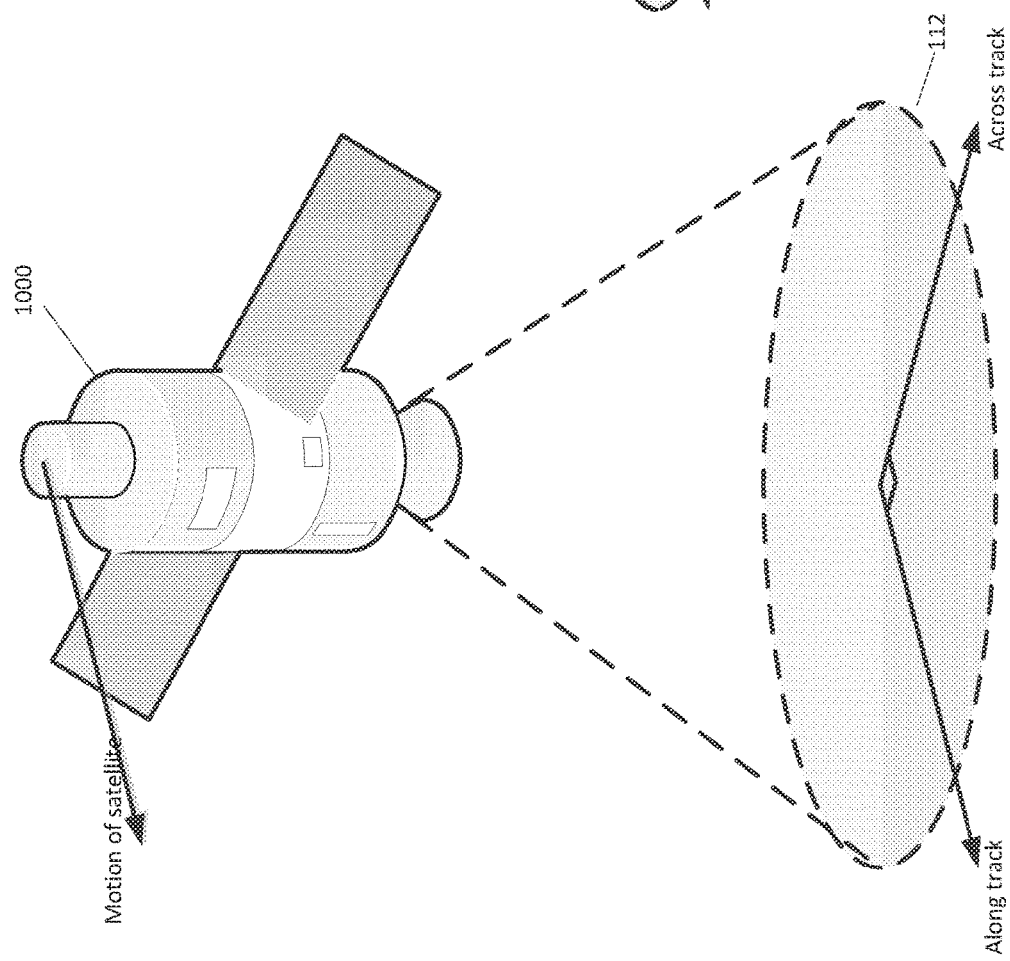
FIG. 1A shows a schematic illustration of a satellite, its motion, and its optical field of view.

FIG. 1A shows a satellite 1000 for earth observation and carrying an earth observation apparatus 1002 having an optical field of view 112 corresponding to a ground area of interest—e.g. on the surface of the earth beneath the satellite. As the satellite orbits the earth it moves in an along-track direction with respect to the surface of the earth. Accordingly, the optical field of view 112 also moves, so that the ground area in the field of view changes over time as the satellite moves along its track.

FIG. 1B shows an earth observation apparatus 1002 carried by a moving aerial platform or satellite such as that illustrated in FIG. 1A. As shown, for obtaining images of the surface of the earth, the apparatus comprises an optical train 101-108, which provides the optical field of view 112. The optical train 101-108 comprises image forming optics 106 configured to form an image of a region of the surface of the earth which is in the field of view 112. The optical train is configured to form the image of the region at an image plane 108 of the optical train.

An image sensor is disposed at the image plane for sensing the image. The image sensor comprises a first active area 109 providing an imaging field of view. It can be seen that the first active area 109 (and hence the imaging field of view; is smaller than the image of the region at the image plane. Accordingly, only a part of the region seen in the optical field of view 112 can be imaged by the first active area 109.

The apparatus 1002 also comprises a view adjuster 101, 102, 105 configured to control the optical train to (a) provide forward motion compensation and (b) provide across-track scanning by displacing the image at the image plane 108 with respect to the imaging field of view.

The forward motion compensation is provided in a series of "stare time" periods. During each stare time, the optical field of view of the apparatus is held fixed with respect to the surface of the earth. In other words, the optical train is controlled to compensate for (e.g. cancel out) the effect of along-track motion of the moving aerial platform or satellite.

The view adjuster provides the along-track scanning by controlling the optical train to displace the image, relative to the imaging field of view, across the image plane in an across-track direction. This is done in a sequence of displacement steps during each stare time. At each step (an exposure time of the image sensor) the active area of the image sensor takes an image frame. Accordingly, by combining these frames the image sensor collects image data from a swathe of regions of the surface of the earth each displaced from the next in an across-track direction but in the same along-track position. The apparatus thus acquires image data from a swathe which is wider than the imaging field of view in the across-track direction. For example this swath can extend across some or all of the optical field of view.

It can thus be seen that the disclosure provides a system in which a forward motion compensation (FMC) de-scanning system is combined with a 'step-stare and share' fast steering mirror, or mirrors. There are many ways to achieve the FMC function, but the core principle remains the same. For any moving platform there is a limited amount of time in which to collect image data from the ground area below the platform before the platform has moved past that area. FMC systems freeze the image of the ground beneath the platform on the focal plane for the stare time. This allows images to be recorded with minimal motion blur during each exposure time within the stare time. Area array detectors allow larger areas to be imaged in snapshots as compared with linear detectors. This leaves more time where no image data is taken and we must wait for the platform to move to a new swath to be imaged. The view adjuster makes use of this unused time (e.g. employing fast scanning mirror technology, or rotating prism sets etc) to select other adjacent ground areas across track to be imaged. Once the new area is in view of the focal plane, FMC starts again and snap-shot images of the new area can be taken. This combination of FMC and step-stare scanning optics goes part way to increasing the swath while maintaining resolution. To increase the field of view, without requiring impractically large, monolithic detectors, a further scanning optic is used, together with a sparse detector arrangement to make better use of the time available for imaging. The scanning optic, mirror, or prism is used to move the image field across-track by a sub-field of view amount, such that each detector images a different area to the previous area. Both areas are still within the field of view of the optic. In addition, the view adjuster can step the whole optical field of view across track to enable another 'stare and share' sequence which further increases the imaged swath. Such gross field of view shifts can be interleaved between successive sequences of displacement steps (e.g. a set of sub-field of view shifts, followed by a gross field of view shift, followed by a further set of sub-field of view). The areas imaged need not be contiguous.

Figure 1C:
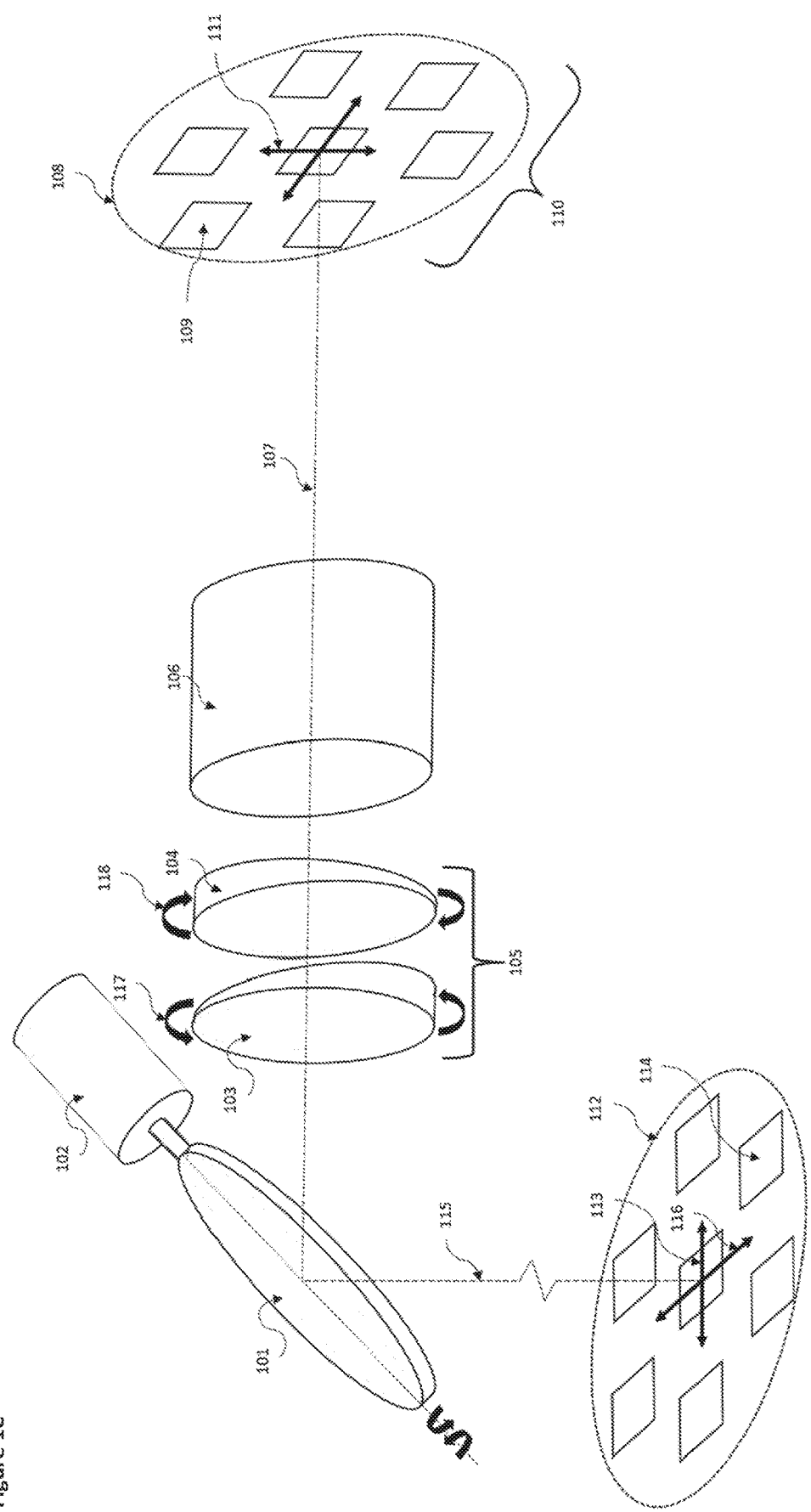
FIG. 1C is a schematic diagram of optical components of an apparatus such as that illustrated in FIG. 1B.

FIG. 1C shows an example of an optical train and a view adjuster such as that used in FIG. 1B. The optical train comprises image forming optics 106, and a first beam steering element 101, 102, and a second beam steering element 103, 104.

The image forming optics 106 are configured to form an image of a region of the surface of the earth which is in the field of view—these are standard and so are not shown in detail FIG. 1C. Similarly the mechanical supports which hold the system together are also not shown in the illustration of FIG. 1C.

The first beam steering element 101, 102 is arranged to provide light from the optical field of view 112 on the ground to the second beam steering element 103, 104. The second beam steering element then provides the light to the image forming optics 106 which form an image 108 of the optical field of view at the image plane 110 (which typically is disposed at the focal plane of the image forming optic 106).

The first beam steering element is operable to displace the image, relative to the imaging field of view, in an across-track direction. The second beam steering element is operable to provide forward motion compensation for a period of time, referred to herein as a "stare time" during which the apparent along-track position of the region of the surface of the earth is static. The combined use of the two beam steering elements is one way to provide adjustments of the view of the earth provided by the instrument, as will be explained below.

The apparatus also comprises an image sensor comprising at least one active area 109 at the image plane 110. It can be seen in FIG. 1C that the active area 109 is smaller than the image 108 of the optical field of view 112. The at least one active area 109 of the image sensor provides an imaging field of view, which represents that part (or those parts) of the image of the optical field of view which can be sampled at the image plane by the image sensor.

The first beam steering element may comprise a flat movable mirror 101 disposed in the optical train at 45 degrees to both the ground normal, 115, and to the optical axis of the instrument, 107. The mirror 101 is coupled to an electromechanical actuator 102 configured to provide discrete angular displacements of the mirror 101. These angular displacements are one way to displace the field of view in an across-track direction by changing the direction in which the optics "look" at the ground. One way to consider this is by reference to a boresight pointing vector. A boresight pointing vector may be defined as the direction from the optical train to the region of the surface of the earth which is in the optical field of view of the instrument. By changing the direction of the boresight pointing vector the view of the earth from the instrument can be adjusted—e.g. displaced as in the directions 116.

The second beam steering element may comprise a pair of counter rotating Risley prisms, 103 and 104, collectively called a Risley wedge system (RWS), 105. A rotary drive is provided (not shown) and is coupled to the prisms so that the prisms are rotated relative to each other (e.g. counter-rotated, as indicated by the arrows 117 and 118). The relative rotation rate of the two prisms can be selected based on the along-track speed of the satellite—e.g. to compensate for forward motion of the satellite. The rotation rate of the two prisms may be the same and the phase alignment of the two may be selected so that the along track field of view entering the focusing optic, 106, moves in the along-track direction, 113, to compensate for forward motion of the satellite. Tuning the prism rotation rate to the effective ground image angular velocity enables the selected field of view, 112, to be frozen at the focal plane, 108. The Risley wedge system, 105, in this example, performs forward motion compensation, FMC, of the image before light enters any focusing optic, 106. This ensures image plane tilt remains aligned with the physical detector focal plane throughout the FMC timeframe (the "stare time").

As shown in FIG. 1C, an image sensor is disposed at the focal plane of the optics 106. The image sensor comprises at least one active area 109, but any number of such active areas may be provided so as to more or less sparsely populate the focal plane with light sensitive areas. A relatively sparsely populated focal plane, 108, is illustrated in FIG. 1C. A 3-share shift pattern is illustrated and may provide an efficient way for any generalised 2-D area to be imaged. Share patterns with more shifts are of course possible and lead to more sparsely populated focal planes. Theoretically any number of detectors, 109, can be used to fill any field of view, 108, with enough share shifts. The trade-off is that more share shifts take more time, which ultimately reduces the swath that can be imaged at a given along track velocity, 402, 502.

An example of an image sensor for use in the system of FIG. 1C is illustrated in FIG. 2. Operation of such a system to sample the optical field of view will now be described with reference to FIG. 3.

FIG. 3 is an illustration of the projection of detector imaging areas, e.g. 201, 205, onto the ground beneath the satellite within the gross optical field of view on the ground 112. In the drawing three sets of tiles are shown, the first set is labelled 1, the second set is labelled 2 and the third set is labelled 3. The three sets of tiles correspond to three successive samples of image data acquired by the active areas e.g. 201, 205 of the image sensor illustrated in FIG. 2 during one "stare time". Throughout the stare time the first beam steering element operates to compensate for forward motion of the satellite or aerial platform. It will be appreciated in the context of the present disclosure that the detectors at the image plane do not move, rather their relative "projection onto" the ground (the part of the imaged area to which the detector at the image plane spatially corresponds) is changed by the view adjuster—in this case a steering mirror and FMC system.

First, the image sensor is operated to capture image data corresponding to the first set of tiles 1. This is done for an exposure time of the sensor to provide a first image frame at each tile 1. The first beam steering element is then operated to provide a first across-track displacement 304 of the image at the focal plane. In the drawing, this is shown as a step to the right, from the first set of tiles 1 to the second set of tiles 2. The image sensor is then operated to capture image data corresponding to the second set of tiles 2. This provides a second image frame at each tile 2. The first beam steering element is then operated to provide a second across-track displacement 306 of the image at the focal plane. The second across-track displacement is shown as a step to the left from the second set of tiles 2 to the third set of tiles 3. It can be seen that the first across track displacement and the second across track displacement together provide complete coverage of the ground area imaged by the focusing optic 106. A complete image can be provided by combining (e.g. spatially stitching together) the first second and third sets of tiles 1, 2, 3. The size of the displacement steps, and their direction is selected according to the layout of the active areas 201, 205 at the focal plane. More or less sub-field 'share shifts', 306 and 304, are needed depending on the size of individual detectors and how close together their position in the common focal plane. An example of a 3-share shift sequence, for a single, sparsely populated focal plane, is shown in FIGS.

2 and 3. Gaps between detectors, 204, allow electronic readout tracks to be accommodated on a single PCB positioned at a single focal plane. The example in FIGS. 2 and 3 uses 7 detectors to sparsely sample the focal plane in each share shift. 3 shift positions, 301, 302 and 303, are required to cover the whole step field of view, 308, with some redundant samples, 307 and 305. Note that some detectors, e.g. 205, in the sparsely populated focal plane, 204, redundantly sample sub-areas already imaged, or areas to be imaged in the preceding or subsequent gross field of view steps. Detectors 305 in share shift 2, 302, and detectors 307 in share shift 3, 303, are outside the area of the current gross field of view step. Black crosses in detectors 305 and 307, indicate no data need be taken from them in their respective share shifts as these areas have, or will be imaged in adjacent gross field of view steps. Image data from these areas can be imaged during across-track steps in sequence as appropriate.

In FIG. 1C, light from the ground area of interest, 112, is selected and reflected by the mirror 101. This may comprise a flat, fast scanning fold mirror. As noted above this may be positioned at 45 degrees to both the ground normal, 115, and the optical axis of the instrument, 107. Other angles may be used. The actuator 102 may be an electromechanical actuator such as a galvo scanning mirror mechanism but many other methods of rotating 45 degree flat fold mirrors can also be used. Prisms could also be used (e.g. 45 degree prisms) but these may be heavy and difficult to move fast enough for reasonable ground track velocities. The same, across track, field step selection mirror, 101, is used for the sub-field share shifts, 304 and 306, shown in FIG. 3. It may also be used to perform gross field of view shifts in the across-track direction, thereby further increasing the total imaging swathe in the stare time.

The focusing optic, 106, may comprise a lens. These typically have a wide field of view compared to Cassegrain telescopes making them ideal for the proposed system. A larger along-track field of view gives more time to select and image adjacent field steps, 409, 410, 411, across-track, using the actuated fold mirror, 101. This maximises the imaged swath in a given time period, for a given platform forward velocity, 402.

By changing rotation phase of the Risley prisms, 103,104, the field of view, 112, can be steered along any polar vector with respect to the optical axis, 107. This can be used if a platform is in a banking turn or performing other manoeuvres. A second Risley wedge system (RWS), could be used in phase but deflecting the field of view, 112, at right angles to the first RWS, to provide for a full x-y, 113, 116, FMC and field selection system. This enables tracking and field selection under any platform, 401, roll or pitch actions. The extra RWS can also replace the fast scanning mirror. In this case, the whole system could be rotated through 90 degrees in order to point directly at the area to be imaged.

Instead of a RWS, 105, before the focusing optic, 106, another fast scanning flat mirror can be placed between the optic, 106, and the focal plane, 108. In order to execute the share shift with this mirror, extra focal planes, or an actuated tilt mechanism for the focal plane, may be added to correct for image plane tilt induced by the mirror. The addition of extra focal planes or fast tilt mechanism may allow all of the share shift images to be in better focus in this scenario.

In summary, there are many different methods of achieving the Step-Stare-Share scanning method proposed, only one example is described.

As illustrated in FIG. 3 each sequence of displacement steps 304, 306 may be considered to provide sub-field-of-view displacement. In addition to this, as shown in FIG. 4 gross field of view shifts may also be provided by displacing the optical field of view in an across-track direction. This may be done by the view adjuster—e.g. by operation of the mirror 101. Thus after each sequence of displacement steps 304, 306, the image may be translated in an across track direction by a gross-field of view shift corresponding to a movement of the entire optical field of view on the ground. The sequence of sub-field displacement steps described above with reference to FIGS. 1 to 3 may be performed for each gross field of view shift. A set of such gross shifts may be performed in each stare time so that the image sensor collects image data from a swathe of regions of the surface of the earth, wherein the swathe is wider than the optical field of view in the across-track direction.

What follows is a description of the concept of operations (CONOPS) for how the Step-Stare-Share scanning system can be used for a multispectral mapping application on an aerial or satellite platform.

The proposed Step-Stare-Share scanning system depicted in FIG. 1, comprising the galvo-motor driven, across-track, step-share mirror, 101 & 102, and the Risley wedge system, 105, in front of a camera system comprising an objective optic, 106, (lens or mirror based) paired with a sparsely populated focal plane, depicted in FIG. 2 is assumed. Over the front of all detectors, e.g. 205, 201, 109, or at another point in the optical path, a filter assembly with application specific spectral bandpass sections is used to provide spectrally distinct, bandpass filtered, imaging area sections, e.g. 208, 209, 210, 211. Assuming a rectilinear detector format, the filter subsections, 208-211, can be arranged to have their long axis, 212, parallel or perpendicular to the direction of motion, 402, 502. Filters can be built in a 'butchers block' assembly method. The butchers block filter arrangement is shown in FIG. 2 as 207. For the purpose of this explanation, we assume the filter subsections, 208-211, long axis is perpendicular to the platform motion, 402 and 50?. We also assume that there are 4 different filter subsections, e.g Blue, 208, green, 209, red, 210, and near infra-red, 211, although any number could be used given the right observing constraints. The projection of the filter sections, 405,406,407 and 408, onto the ground area to be imaged, is shown in FIG. 4. The imaging method moves the field of view, 112 and 404, in across-track steps, 403 and 504, between successive stare-share snap-shot displacement sequences, 304 and 306, fast enough to image the total desired swath width, the sum of 409, 410 and 411 or 509, before the platform has moved forward by the length of a single filter band section projection on the ground, e.g. 405 and 501. Thus, the swathe area can be imaged in all spectral sub-bands in one pass of the platform rather than several passes with smaller swath coverage. The field of view, 112 and 404, is moved and then held stationary on the focal plane by FMC for each snapshot, the field of view is not continuously scanned as this would cause blurring of the imagery. Many methods of changing the field of view can be used. For example, a 2-axis scanning mirror, an actuated Pechan prism, or similar device in front of the camera. The implementation method of selecting the field of view is irrelevant, as long as it is moved accurately, and fast enough to allow time for frame exposure during the overhead pass of the platform. Enough overlap between the area section samples in both along and across track directions is given to allow seamless stitching of the data into a continuous map.

A detector with an RGB bayer pattern filter over the detector can be thought of as a single band over the whole FoV. This would maximise the swath for a true colour image with a minor loss of resolution due to sparse colour sampling.

The spectral bands could also be split using dichroic reflectors and sent to multiple focal planes. This complicates the optical design and puts some practical limits on the number of spectral bands used but, also maximises the swathe imaged in a single pass.

It will be appreciated from the discussion above that the embodiments shown in the Figures are merely exemplary, and include features which may be generalised, removed or replaced as described herein and as set out in the claims.

With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the functionality of the controller described herein may be provided by mixed analogue and digital processing and/or control functionality. It may comprise a general purpose processor, which may be configured to perform a method according to any one of those described herein. In some examples the controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality.

An embodiment provides an analogue control circuit configured to perform any one or more of the methods described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments.

Furthermore, equivalents and modifications not described above may also be employed without departing from the scope of the invention, which is defined in the accompanying claims. These claims are to be interpreted with due regard for equivalents.

The present disclosure also comprises the following numbered clauses:

1. An earth observation apparatus to be carried by a moving aerial platform or satellite for obtaining images of the surface of the earth, the apparatus comprising:
   an optical train having an optical field of view for imaging a region of the surface of the earth and being configured to form an image of the region at an image plane;
   an image sensor disposed at the image plane, the image sensor comprising a first active area providing an imaging field of view, wherein the imaging field of view is smaller than the image of the region at an image plane;
   a view adjuster configured to control the optical train to:
      provide forward motion compensation for a stare time during which the apparent along-track position of the region of the surface of the earth is static to compensate for along-track motion of the moving aerial platform or satellite; and to
      displace the image, relative to the imaging field of view, in an across-track direction in a sequence of displacement steps during each stare time so that the image sensor collects image data from a swathe of regions of the surface of the earth, wherein the swathe is wider than the imaging field of view in the across-track direction.

2. The apparatus of clause 1 wherein the spacing between the active areas of the image sensor and the displacement steps are selected so that the swathe spans the optical field of view in the across-track direction.

3. The apparatus of clause 1 or 2 wherein the sequence of displacement steps is configured so that image data obtained from the active area during each stare time provides a contiguous swathe.

4. The apparatus of any preceding clause wherein the sequence of displacement steps comprises at least one forward displacement step in a first direction and at least one reverse displacement step in a second direction opposite to the first direction.

5. The apparatus of any preceding clause wherein the displacement steps are selected to provide an across-track overlap between adjacent portions of image data.

6. The apparatus of any preceding clause wherein the image sensor further comprises a second active area spaced apart from the first active area in an across-track direction in the image plane.

7. The apparatus of any preceding clause wherein the image sensor comprises a third active area, spaced apart from the first active area in an along-track direction in the image plane.

8. The apparatus of clause 7 wherein the third active area is misaligned with the first active area in the across-track direction.

9. The apparatus of clause 8 as dependent upon clause 6 wherein the third active area is also misaligned with the second active area in the across-track direction, for example wherein the third active area is disposed on a midline between the first active area and the second active area.

10. The apparatus of clause 9 wherein the sequence of displacement steps is selected so that image data obtained from the third active area during each stare time spans the swathe in the across-track direction.

11. The apparatus of clause 10 wherein the sequence of displacement steps is selected so that at least some of the image data from the first and/or second active area is redundant or duplicated.

12. The apparatus of any preceding clause wherein the stare time is selected so that the along-track motion of the field of view during successive stare times is less than the along-track width of the imaging field of view to provide an along-track overlap between adjacent images.

13. The apparatus of any preceding clause wherein the image sensor comprises a plurality of active areas spaced apart in an array, and the array comprises a plurality of rows of active areas and each row is arranged so that the spaces between active areas are staggered with respect to the spaces in an adjacent row, for example in the manner of a stretcher-bond brick-laying pattern.

14. The apparatus of clause 13 wherein the array comprises a plurality of discrete image sensor chips and the wiring connections for the chips are provided in the spacing between them in the image plane.

15. The apparatus of any preceding clause wherein the view adjuster comprises a first beam steering element for displacing the field of view in the across-track direction.

16. The apparatus of clause 15 wherein the first beam steering element comprises a reflective element such as a fast-steering mirror.

17. The apparatus of clause 16 wherein the first beam steering element comprises an electromechanical actuator configured to provide discrete angular displacements of the reflective element, for example wherein the electromechanical actuator comprises a galvo scanner.

18. The apparatus of clause 17 wherein the discrete angular displacements correspond to discrete across-track displacements of the field of view on the surface of the earth.

19. The apparatus of clause 17 wherein the discrete across track displacements correspond to the size of the active areas of the image sensor in the image plane.

20. The apparatus of any preceding clause wherein the view adjuster comprises a second beam steering element for displacing the field of view in the along-track direction to provide the forward motion compensation.

21. The apparatus of clause 20 wherein the second beam steering element is configured to displace the field of view for the stare time at a rate selected based on the along-track motion of the aerial platform or satellite, and to provide a reset displacement between each stare time.

22. The apparatus of clause 20 or 21 wherein the second beam steering element comprises a Risley-prism pair.

23. The apparatus of any preceding clause wherein the optical train comprises a boresight pointing vector corresponding to the direction from the optical train to the region of the surface of the earth, and the view adjuster is configured to displace the field of view by changing the direction of the boresight pointing vector.

24. The apparatus of any preceding clause wherein the optical train comprises a filter assembly configured to provide multispectral imaging, for example wherein the filter assembly comprises at least one of: a plurality of rectangular filters each corresponding to a different frequency; a bayer filter; and at least one dichroic reflector.

25. The apparatus of any preceding clause wherein the view adjuster is further configured to provide a gross field of view shift by displacing the optical field of view in an across-track direction after the sequence of displacement steps, for example wherein a second sequence of said displacement steps is performed after the gross field of view shift within each stare time so that the image sensor collects image data from a swathe of regions of the surface of the earth, wherein the swathe is wider than the optical field of view in the across-track direction.

The invention claimed is:

1. An earth observation apparatus to be carried by a moving aerial platform or satellite for obtaining images of the surface of the earth, the apparatus comprising:
    an optical train having an optical field of view for imaging a region of the surface of the earth and being configured to form an image of the region at an image plane;
    an image sensor disposed at the image plane providing an imaging field of view;
    a view adjuster configured to control the optical train to:
        provide forward motion compensation for a stare time; and to
        displace the image, relative to the imaging field of view, in an across-track direction in a sequence of discrete displacement steps during each stare time;
    wherein the image sensor comprises a plurality of active areas, each comprising an area array detector and the active areas being spaced apart by inactive areas at the image plane wherein each active area captures a frame of image data for each discrete displacement step thereby to capture a plurality of frames for each discrete displacement step
    and the plurality of frames captured for each discrete displacement step are displaced in the across-track direction, relative to the imaging field of view, from the plurality of frames captured for the next discrete step.

2. The apparatus of claim 1 wherein the frame of image data captured by each active area for each discrete displacement step is captured in a snapshot.

3. The apparatus of claim 1 wherein the frame of image data captured by each active area for each discrete displacement step is captured either (a) prior to the each discrete displacement step or (b) after the each discrete displacement step, for example wherein the capture of image data is interleaved between displacement steps.

4. The apparatus of claim 1 wherein the view adjuster is configured to hold the across track position of the image relative to the imaging field of view static while the image data is captured.

5. The apparatus of claim 1 wherein the spacing between the active areas of the image sensor and the discrete displacement steps is selected so that the swathe spans the optical field of view in the across-track direction.

6. The apparatus of claim 1 wherein the sequence of discrete displacement steps is configured so that image data obtained from the active area during each stare time provides a contiguous swathe.

7. The apparatus of claim 1 wherein the sequence of discrete displacement steps comprises at least one forward displacement step in a first direction and at least one reverse displacement step in a second direction opposite to the first direction.

8. The apparatus of claim 1 wherein the plurality of active areas comprises a first active area and a second active area spaced apart from the first active area in an across-track direction in the image plane.

9. The apparatus of claim 1 wherein the plurality of active areas comprises a first active area and an active area spaced apart from the first active area in an along-track direction in the image plane.

10. The apparatus of claim 1 wherein the image sensor comprises a plurality of active areas spaced apart in an array.

11. The apparatus of claim 10 wherein the array comprises a plurality of discrete image sensor chips and wiring connections for the plurality of discrete image sensor chips are provided in spaces between the plurality of discrete image sensor chips in the image plane.

12. The apparatus of claim 1 wherein the view adjuster comprises a reflective element, an electromechanical actuator configured to provide discrete angular displacements of the reflective element, and the discrete angular displacements correspond to discrete across-track displacements of the field of view on the surface of the earth.

13. The apparatus of claim 12 wherein the discrete across track displacements correspond to the size of the active areas of the image sensor in the image plane.

14. The apparatus of claim 1 wherein the view adjuster comprises a second beam steering element for displacing the field of view in the along-track direction to provide the forward motion compensation.

15. The apparatus of claim 14 wherein the second beam steering element is configured to displace the field of view for the stare time at a rate selected based on the along-track motion of the aerial platform or satellite, and to provide a reset displacement between each stare time.

16. The apparatus of claim 1 wherein the optical train comprises a filter assembly configured to provide multispectral imaging.

17. The apparatus of claim 1 wherein the view adjuster is further configured to provide a gross field of view shift by displacing the optical field of view in an across-track direction after the sequence of displacement steps, for example wherein a second sequence of said displacement steps is performed after the gross field of view shift within each stare time so that the image sensor collects image data from a swathe of regions of the surface of the earth, wherein the swathe is wider than the optical field of view in the across-track direction.

18. The apparatus of claim 1 wherein at each discrete displacement step each said area array detector takes an image frame in a snapshot.

19. The apparatus of claim 18 wherein the forward motion compensation provides that, for the duration of the stare time, the apparent along-track position of the region of the surface of the earth is static to compensate for along-track motion of the moving aerial platform or satellite.

20. The apparatus of claim 1 wherein the sequence of discrete displacement steps causes the image sensor to collect image data from a swathe of regions of the surface of the earth, wherein the swathe is wider than the imaging field of view in the across-track direction.

21. The apparatus of claim 1 wherein the active areas of the image sensor each comprise a separate area array detector, and the active areas are spaced apart from one another at the image plane by inactive areas.

* * * * *